(12) United States Patent
Breziat

(10) Patent No.: US 11,618,084 B2
(45) Date of Patent: Apr. 4, 2023

(54) METHOD FOR MANUFACTURING A CONNECTING PART

(71) Applicant: VALLOUREC OIL AND GAS FRANCE, Aulnoye-Aymeries (FR)

(72) Inventor: Nicolas Breziat, Valenciennes (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 470 days.

(21) Appl. No.: 16/632,219

(22) PCT Filed: Jul. 18, 2018

(86) PCT No.: PCT/EP2018/069477
§ 371 (c)(1),
(2) Date: Jan. 17, 2020

(87) PCT Pub. No.: WO2019/016254
PCT Pub. Date: Jan. 24, 2019

(65) Prior Publication Data
US 2020/0206815 A1     Jul. 2, 2020

(30) Foreign Application Priority Data

Jul. 18, 2017    (FR) .................................... 1756794

(51) Int. Cl.
*B22F 5/00*          (2006.01)
*E21B 17/042*     (2006.01)
(Continued)

(52) U.S. Cl.
CPC ............. *B22F 12/00* (2021.01); *B33Y 10/00* (2014.12); *B22F 10/10* (2021.01);
(Continued)

(58) Field of Classification Search
CPC .... B22F 12/00; B22F 10/10; B22F 2005/001; B22F 2999/00; B22F 10/20; B22F 5/106;
(Continued)

(56) References Cited

U.S. PATENT DOCUMENTS

| 8,286,715 B2* | 10/2012 | Bailey | ..................... E21B 41/00 166/380 |
| 9,364,299 B2* | 6/2016 | Marlin | ................. A61C 8/0089 |

(Continued)

FOREIGN PATENT DOCUMENTS

| WO | WO 2016/032451 A1 | 3/2016 |
| WO | WO 2016/172014 A1 | 10/2016 |
| WO | WO 2017/078660 A1 | 5/2017 |

OTHER PUBLICATIONS

International Search Report dated Nov. 26, 2018 in PCT/EP2018/069477 filed on Jul. 18, 2018, 3 pages.

*Primary Examiner* — Lawrence Averick
(74) *Attorney, Agent, or Firm* — Oblon, McClelland, Maier & Neustadt, L.L.P.

(57) ABSTRACT

A method for manufacturing a connecting part includes a first portion having a threaded end that is able to be screwed to the end of a first tubular component for connecting the connecting part to said first tubular component, the method comprising a step of producing, by an additive manufacturing method, a second portion of the connecting part juxtaposed with the first portion having a threaded end. Moreover, the first portion having a threaded end is obtained by reworking the first portion on a separate tubular component of the connecting part in order to be joined to the connecting part.

17 Claims, 2 Drawing Sheets

(51) Int. Cl.
   *B22F 12/00* (2021.01)
   *B33Y 10/00* (2015.01)
   *B33Y 30/00* (2015.01)
   *B33Y 80/00* (2015.01)
   *B29C 64/153* (2017.01)
   *B23K 26/34* (2014.01)
   *B22F 10/10* (2021.01)

(52) U.S. Cl.
   CPC ..... *B22F 2005/001* (2013.01); *B22F 2999/00* (2013.01); *B23K 26/34* (2013.01); *B29C 64/153* (2017.08); *B33Y 30/00* (2014.12); *B33Y 80/00* (2014.12); *E21B 17/042* (2013.01)

(58) Field of Classification Search
   CPC ......... B22F 10/00; B33Y 10/00; B33Y 30/00; B33Y 80/00; B23K 26/34; B29C 64/153; E21B 17/042; E21B 17/02; Y02P 10/25
   See application file for complete search history.

(56) References Cited

U.S. PATENT DOCUMENTS

| | | | |
|---|---|---|---|
| 10,390,908 B2* | 8/2019 | Marlin | A61C 8/0012 |
| 11,002,390 B2* | 5/2021 | Harris | F16L 19/025 |
| 11,155,730 B2* | 10/2021 | Yasuda | C08L 33/04 |
| 11,248,431 B1* | 2/2022 | Dossary | E21B 17/021 |
| 2011/0042069 A1* | 2/2011 | Bailey | E21B 17/042 |
| | | | 166/243 |
| 2014/0205969 A1* | 7/2014 | Marlin | A61C 8/0068 |
| | | | 433/196 |
| 2015/0273586 A1* | 10/2015 | Ross | B22F 7/06 |
| | | | 219/76.14 |
| 2016/0258256 A1 | 9/2016 | Nguyen et al. | |
| 2016/0262852 A1* | 9/2016 | Marlin | A61C 9/0046 |
| 2016/0312545 A1* | 10/2016 | Walker | E21B 17/1078 |
| 2018/0258313 A1* | 9/2018 | Yasuda | C08G 59/00 |
| 2018/0274357 A1 | 9/2018 | Jaaskelainen et al. | |
| 2019/0137014 A1* | 5/2019 | Harris | B22F 5/009 |
| 2021/0304471 A1* | 9/2021 | Mitsumoto | G06T 11/60 |
| 2022/0025728 A1* | 1/2022 | Dossary | E21B 31/06 |

* cited by examiner

METHOD FOR MANUFACTURING A CONNECTING PART

The present invention relates, in a general way, to tubular components and, more precisely, connecting parts or accessories intended to be connected to at least one tubular component.

More particularly, the invention relates to a method for manufacturing a connecting part intended to be connected to at least one tubular component.

Tubular component in the meaning of the present invention means any element or accessory used in drill strings for drilling or operating an oil or a gas well, or the elements used to make gas or oil pipelines.

These tubular components are steel.

In the field of oil and gas extraction, whether ire the context of an offshore or onshore installation that involves well drilling or extraction operations, it is frequently necessary to connect tubular components of different diameter and/or thickness or of identical diameter and/or thickness but whose threaded ends are not compatible.

According to another case, it may be necessary to add an intermediate part between two tubular components so as to provide a particular function. For example, the intermediate part can be equipped with a valve intended to control the flow passing though the tubular components, or equipped with blades intended to provide rigidity and support points in the well.

According to yet another case, it may be necessary to plug the end of a tubular component.

However, suitable accessories of the cross-over or plug type, for example, configured to be screwed onto the desired tubular components, are not always available on the drilling site.

Traditionally, the manufacture of such a part starts with a step of machining bars until the appropriate threaded end or ends is/are obtained, which represents a long and costly machining time. The performance qualities and dimensions of the part obtained and in particular of the connection must then be inspected in order to guarantee performance.

Finally, in a third step, the part can be subjected to surface treatment. The threaded ends must also display good performance qualities in terms of resistance to corrosion and lubricating properties.

It is also necessary to protect the threads against jamming, in particular during screwing and unscrewing operations. In effect, on the well, the threads may have to undergo several screwing and unscrewing cycles.

Such manufacturing requires heavy equipment, for example, turning machines accommodating tubular components approximately 10 meters in length, and this equipment is rarely compatible with the space available on a site, and this equipment necessitates the presence of specialized operators on site.

Finally, the manufacturing location is usually distant from the utilization location of the components.

This manufacturing can prove to be relatively long and consequently costly. In particular, if the extraction is localized on an offshore platform, the operations to conduct on the drilling site are suspended until the accessory is brought by helicopter, which in turn is dependent on the meteorological conditions. The absence of a suitable tubular component or accessory for completing operations of drilling or producing a gas or oil well can cause the immobilization of drilling or extraction activities on site, therefore possibly causing very significant financial and operational consequences.

The aim of the invention is therefore to remedy these disadvantages and relates to a simple and fast method for manufacturing a connecting part intended to be connected to at least one tubular component.

A method for manufacturing a connecting part is thus proposed, comprising a first portion having a threaded end that is able to be screwed to the end of a first tubular component for connecting the connecting part to said first tubular component. The method comprises a step of producing, by an additive manufacturing method, a second portion of the connecting part juxtaposed with the first portion having a threaded end.

It is possible to envisage that the second portion has a configuration conferring a supplementary function on the part, additional to its connecting function. The second portion can for example comprise a safety valve intended to control the fluid passing though the tubular components to which the connected part is connected.

Alternatively, the second portion can be equipped with a gripping handle for producing a lifting part for tubular components.

In another variant, the second portion can comprise a pipe leading on one hand to the inside recess of the tubular part and on the other to an outside side wall of the tubular component, arranged to circulate a fluid. The formed part is then a circulation head.

Moreover, the first portion having a threaded end is obtained by reworking the first portion having the threaded end on a separate tubular component of the connecting part in order to be joined to the connecting part.

According to an embodiment, the reworking of the first portion having the threaded end on a separate tubular component of the connecting part is done by cutting.

The first portion preferably comprises a coating of its surface already present on the separate tubular component before reworking.

The first portion preferably comprises a coating on at least part of the surface of the thread of the threaded end, said coating already being present before reworking said first portion of the separate tubular component.

The first portion preferably comprises a surface treatment already performed on the separate tubular component before reworking. Said surface treatment is preferably performed on at least part of the surface of the thread of the threaded end.

In an embodiment, the second portion produced by an additive manufacturing method is produced independently of the rest of the connecting part, then the second portion is connected to the first portion having a threaded end.

According to some embodiments, the first portion and the second portion are connected by additive manufacturing.

According to other embodiments, the first portion and the second portion are connected by welding.

The second portion produced by an additive manufacturing method can be formed from a separate end of the threaded end of the first portion of the connecting part.

In addition, the separate end can be an end opposite the threaded end of the first portion of the connecting part.

The manufacturing method can comprise a step intended to connect the second portion to a third portion.

According to some embodiments, the third portion is connected to the second portion by additive manufacturing.

According to other embodiments, the third portion is connected to the second portion by welding.

According to another characteristic, the third portion can include a threaded end intended to be screwed to the end of a second tubular component.

Advantageously, the third portion having a threaded end is obtained by reworking the third portion having the threaded end on a separate tubular component of the connecting part comprising the third portion having the threaded end.

Moreover, the third portion can include a coating of its surface already present on the separate tubular component before reworking.

The third portion can comprise a coating on at least part of the surface of the thread of the threaded end, said coating already being present before reworking said third portion of the separate tubular component.

According to an embodiment, the reworking of the third portion on a separate tubular component of the connecting part is done by cutting.

Moreover, the first portion and the third portion can possess different chemical compositions and mechanical properties.

Other aims, advantages and characteristics will emerge from the description that will follow, given as a purely illustrative example and made with reference to the attached drawings, on which:

Figure 1:
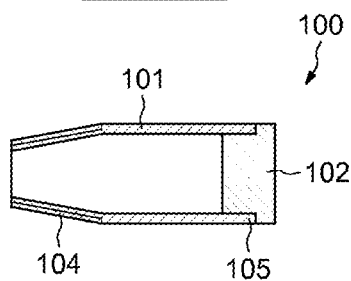
FIG. 1 is a sectional view of a connecting part according to a first embodiment of the invention.

FIG. 1 illustrates a first embodiment of a connecting part, designated by the numerical reference 100. The accessory 100 corresponds to a plug comprising two portions 101, 102 and is intended movably to close the end of a tubular component, not illustrated.

The first portion 101 advantageously includes a male threaded end 104 able to be screwed to the end of a tubular component to be plugged endowed with a female complementary thread. The portion 101 is obtained by reworking on a separate tubular component, not visible on the figures, comprising the threaded end 104 suitable for being connected to the tubular component to be plugged. In the illustrated example, the portion 101 is obtained, more precisely, by cutting. The separate tubular component to which the portion 101 is collected is advantageously a tubular component available on the utilization location of the connecting part 100, such as, in the illustrated example, a drilling site for oil or gas extraction. For example, said separate tubular component is a casing. This allows an operator to take threaded portions from a stock of tubular components present on site, a specimen chosen among surplus components and therefore not critical to the implementation of the string of tubular components, and comprising said suitable threaded end 104.

A second portion 102 is juxtaposed with the first portion 101. The second portion 102 is obtained by an additive manufacturing method, preferably from the end 105 opposite the threaded end 104, which acts as a support for starting the additive manufacturing.

Additive manufacturing means any method allowing an object to be manufactured, and in particular, a metal object, by superposing layers of material based on a 3D digital model.

The additive manufacturing methods suitable for producing a metal object use a laser locally heating a metal powder, generally in successive layers. In certain methods, like the laser metal deposition (LMD) method developed by IREPA Laser and offered by BeAM, a metal powder is projected by a nozzle along a trajectory passing through a laser, which heats and melts the metal before depositing it. These additive manufacturing methods can also be based on material deposited by a metal wire heated by a laser.

These methods make it possible to use a wide variety of metals, ranging from stainless steels like 316 L or APX4 to titanium alloys such as Ti6Al4V.

Figure 2:
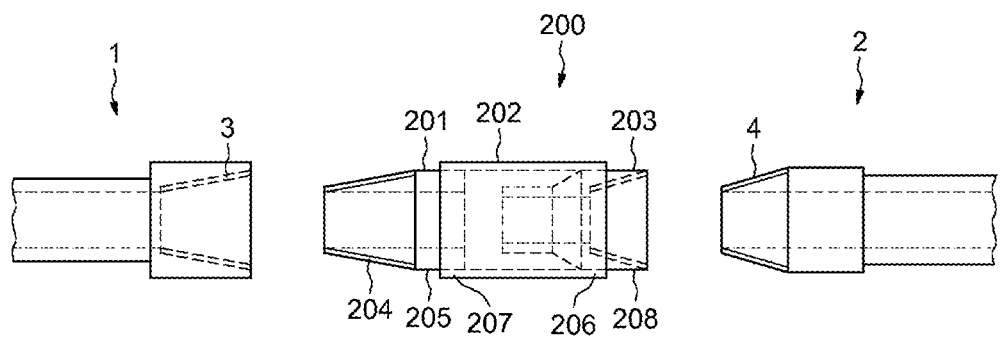
FIG. 2 illustrates a connecting part according to a second embodiment and first and second tubular components to which the connecting part is able to be connected.

FIG. 2 illustrates a second embodiment of a connecting part 200 corresponding to a connection, otherwise called cross-over, intended to connect two tubular components 1 and 2 having non-compatible threaded ends. The accessory 200 advantageously comprises three portions 201, 202 and 203.

The first portion 201 includes a male threaded end 204 able to be screwed to one of the ends of the first tubular component 1 comprising a female thread 3. It further includes an end 205, preferably opposite the threaded end 204.

The second portion 202, juxtaposed with the first portion 201 is formed by additive manufacturing from the end 205.

In addition, the end 206 of the second portion 202, opposite the end 207, which is connected to the first portion 201, is connected to a third portion 203, for example by additive manufacturing.

The third portion 203 comprises for example a female threaded end 208 able to be screwed to a male threaded end 4 of the second tubular component 2.

Figure 3:
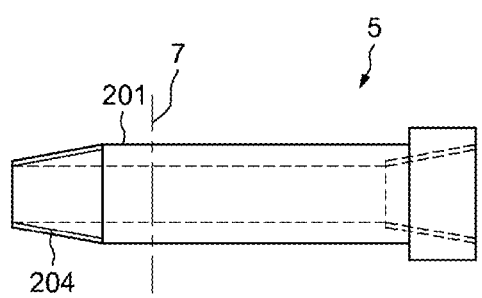
FIGS. 3 and 4 illustrate two tubular components used to manufacture the connecting part illustrated at FIG. 2
Figure 4:
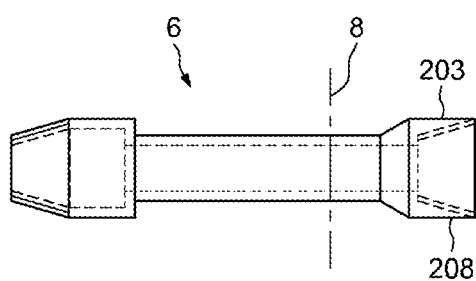

The first and third portions 201 and 203 of the part 200 are, in the illustrated example, both obtained by cutting separate tubular components, respectively 5 and 6 shown on FIGS. 3 and 4, each cut by an axis, respectively 7 and 8.

The separate tubular components 5 and 6 preferably comprise a coating on at least a part of the surface of the thread of their threaded ends, respectively 204 and 208, the coating providing the surface properties described above, such that the described manufacturing method can dispense with a step of surface treatment of the threaded ends of the connecting parts, for example phosphating or nitriding of the surface, which makes the method relatively faster than a manufacturing method encompassing this step.

Figure 5:
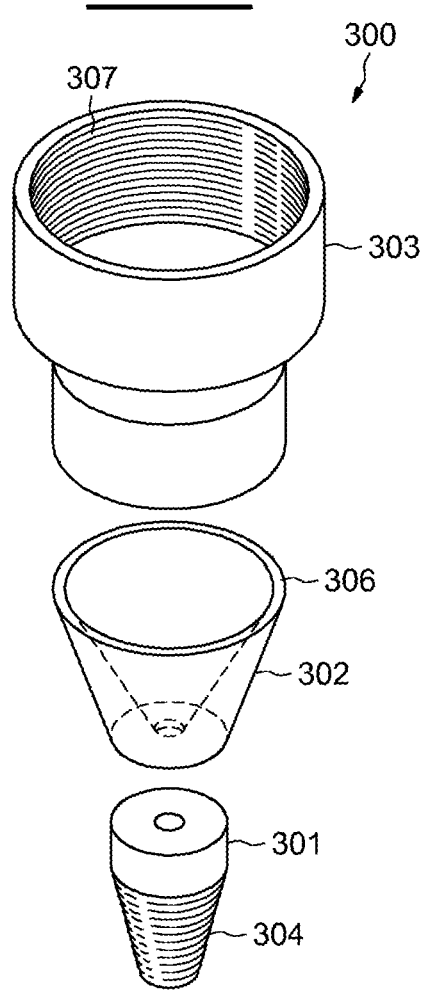
FIG. 5 illustrates a perspective exploded view of a connecting part according to a third embodiment of the invention.

FIG. 5 illustrates a third embodiment of a connecting part 300 comprising three portions 301, 302 and 303. The connection 300 is intended to connect two tubular components, not illustrated, not compatible because the diameter, the thickness, the geometry of the thread or the grades of steel to connect are different.

The first portion 301 comprises a male threaded end 304 intended to be connected to a first tubular component to which the part 300 must be connected.

In the illustrated example, the second portion 302 is produced by additive manufacturing independently of the rest of the part 300. Moreover, it possesses, advantageously, a cone portion shape allowing it to be connected to the first portion 301 and to a third portion 303 of a different diameter.

The second portion 302 is connected to the first and third portions 301 and 303 by additive manufacturing. In the illustrated example, the second portion 302 comprises a substantially flat surface 305, 306 at its ends so as to simplify its connection to the other two portions 301 and 303 and to ensure the reliability thereof.

The third portion 303 comprises a female threaded end 307 able to be screwed to a male threaded end of a second tubular component to which the part 300 must be connected.

What is more, the first and third portions in this example are obtained by cutting separate tubular components comprising a coating on their surface, and in particular, a coating on at least part of the surface of their threads.

Figure 6:
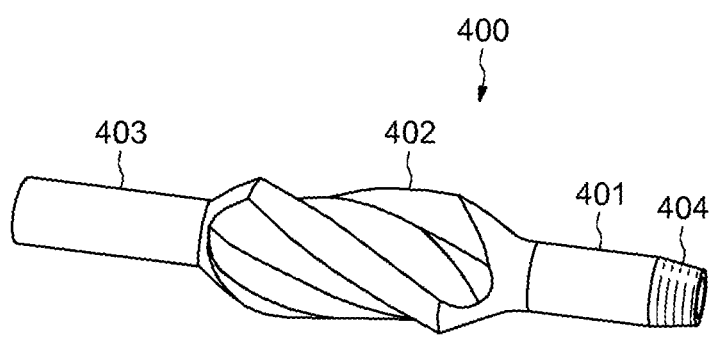
FIG. 6 is a perspective view of a connecting part according to a fourth embodiment of the invention.

Finally, FIG. 6 shows a fourth embodiment of a connecting part according to the invention. In the illustrated example, the part 400 corresponds to a connection part configured to be connected to two tubular components, not visible on the figures.

A second portion 402, obtained by additive manufacturing, is juxtaposed with a first portion 401 having a threaded end 404 and with a third portion 403.

The first and third portions 401 and 403 are both obtained by cutting a separate tubular component not illustrated.

In an alternative embodiment, it is possible to envisage that the first and third portions 201, 301, 401 and 203, 303, 403 are connected to the second portion 202, 302, 402 not by a method of additive manufacturing, but by a traditional welding method.

In the example shown at FIG. 6, the second portion 402 comprises blades intended to provide rigidity and support points in the well in which the part 400 is used.

In effect, it is possible in another embodiment to envisage that the second portion produced by additive manufacturing has a configuration conferring a supplementary function on the part, additional to its connecting function, different from that described above. The second portion can for example comprise a safety valve, a gripping handle or a circulation head.

According to an alternative to reworking a first portion by cutting on a separate tubular component of the connecting part, it is possible to envisage reworking and using a first portion without prior cutting. For example, it is possible to envisage reworking a tool joint to connect it to a second portion produced by additive manufacturing. In another example, it is possible to envisage reworking a coupling to connect it to a second portion produced by additive manufacturing, either by taking from a stock of isolated couplings or by unscrewing a coupling from an oil well tube. Tool joints and couplings are short parts, less than 1 meter in length, and provided with threaded ends. The tool joint can have a male threaded end or a female threaded end; a coupling usually comprises two female threaded ends, not necessarily identical.

Advantageously, the first, second and third portions of the second, third and fourth embodiments are hollow so as to maintain a fluidic communication between the first and second tubular components connected by the part.

The invention claimed is:

1. A method for manufacturing a connecting part comprising a first portion having a threaded end that is able to be screwed to the end of a first tubular component for connecting the connecting part to said first tubular component, the method comprising:
    a step of producing, by an additive manufacturing method, a second portion of the connecting part juxtaposed with the first portion having a threaded end; and
    a step of connecting the second portion to a third portion, wherein the first portion having a threaded end is obtained by reworking the first portion on a separate tubular component of the connecting part in order to be joined to the connecting part.

2. The manufacturing method as claimed in claim 1, wherein the reworking of the first portion having the threaded end on a separate tubular component of the connecting part is done by cutting.

3. The manufacturing method as claimed in claim 1, wherein the first portion comprises a coating of its surface already present on the separate tubular component before reworking same.

4. The manufacturing method as claimed in claim 3, wherein the first portion comprises a coating on at least part of the surface of the thread of the threaded end, said coating already being present before reworking said first portion of the separate tubular component.

5. The manufacturing method as claimed in claim 1, wherein the second portion produced by an additive manufacturing method is produced independently of the rest of the connecting part, then the second portion is connected to the first portion having a threaded end.

6. The manufacturing method as claimed in claim 5, wherein the first portion and the second portion are connected by additive manufacturing.

7. The manufacturing method as claimed in claim 5, wherein the first portion and the second portion are connected by welding.

8. The manufacturing method as claimed in claim 1, wherein the second portion produced by an additive manufacturing method is formed from a separate end of the threaded end of the first portion of the connecting part.

9. The manufacturing method as claimed in claim 8, wherein the separate end is an end opposite the threaded end of the first portion of the connecting part.

10. The manufacturing method as claimed in claim 1, wherein the third portion is connected to the second portion by additive manufacturing.

11. The manufacturing method as claimed in claim 1, wherein the third portion is connected to the second portion by welding.

12. The manufacturing method as claimed in claim 1, wherein the third portion includes a threaded end intended to be screwed to the end of a second tubular component.

13. The manufacturing method as claimed in claim 12, wherein the third portion having a threaded end is obtained by reworking the third portion having the threaded end on a separate tubular component of the connecting part comprising the third portion having the threaded end.

14. The manufacturing method as claimed in claim 13, wherein the third portion comprises a coating of its surface already present on the separate tubular component before reworking same.

15. The manufacturing method as claimed in claim 14, wherein the third portion comprises a coating on at least part of the surface of the thread of the threaded end, said coating already being present before reworking said third portion of the separate tubular component.

16. The manufacturing method as claimed in claim 13, wherein the reworking of the third portion on a separate tubular component of the connecting part is done by cutting.

17. The manufacturing method as claimed in claim 1, wherein the first portion and the third portion have a different chemical composition and different mechanical properties.

* * * * *

UNITED STATES PATENT AND TRADEMARK OFFICE
CERTIFICATE OF CORRECTION

PATENT NO. : 11,618,084 B2
APPLICATION NO. : 16/632219
DATED : April 4, 2023
INVENTOR(S) : Breziat It is certified that error appears in the above-identified patent and that said Letters Patent is hereby corrected as shown below:

In the Claims

In Column 1, Line 16, delete "ire" and insert -- in --, therefor.

In Column 4, Line 12, delete "316 L" and insert -- 316L --, therefor.

Signed and Sealed this
Second Day of January, 2024

Katherine Kelly Vidal
*Director of the United States Patent and Trademark Office*